United States Patent
Thoumy et al.

(10) Patent No.: US 9,356,722 B2
(45) Date of Patent: May 31, 2016

(54) TIME SENSITIVE TRANSACTION OVER AN ASYNCHRONOUS SERIAL LINK

(71) Applicant: CANON KABUSHIKI KAISHA, Tokyo (JP)

(72) Inventors: François Thoumy, Vignoc (FR); Brice Le Houerou, Acigne (FR); Patrice Nezou, Saint-Sulpice la Foret (FR)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 13/939,105

(22) Filed: Jul. 10, 2013

(65) Prior Publication Data

US 2014/0016538 A1    Jan. 16, 2014

(30) Foreign Application Priority Data

Jul. 13, 2012    (GB) .................................. 1212517.5

(51) Int. Cl.
*H04J 3/06* (2006.01)
*H04L 12/815* (2013.01)

(52) U.S. Cl.
CPC ............... *H04J 3/0697* (2013.01); *H04L 47/22* (2013.01)

(58) Field of Classification Search
None
See application file for complete search history.

(56) References Cited

U.S. PATENT DOCUMENTS

| | | | | |
|---|---|---|---|---|
| 4,799,052 A * | 1/1989 | Near et al. | ..................... | 370/451 |
| 7,577,136 B1 * | 8/2009 | Devanagondi et al. | ....... | 370/389 |
| 8,392,637 B2 * | 3/2013 | Diab et al. | ........................ | 710/59 |
| 2003/0218981 A1 * | 11/2003 | Scholten | ........................ | 370/235 |
| 2005/0013250 A1 * | 1/2005 | Kauschke et al. | ............. | 370/235 |
| 2007/0248118 A1 * | 10/2007 | Bishara et al. | ................. | 370/469 |
| 2008/0056424 A1 * | 3/2008 | Chang et al. | ................... | 375/371 |
| 2010/0061238 A1 * | 3/2010 | Godbole et al. | .............. | 370/235 |
| 2014/0328356 A1 * | 11/2014 | Cachin et al. | .................. | 370/509 |

FOREIGN PATENT DOCUMENTS

WO    2008/027760 A1    3/2008

* cited by examiner

*Primary Examiner* — Benjamin Lamont
(74) *Attorney, Agent, or Firm* — Canon USA Inc. IP Division

(57) ABSTRACT

A method of controlling data transmission from a transmitting unit to a receiving unit through an asynchronous serial link is provided. The method is performed by a controlling unit and includes the steps of sequentially receiving data and synchronization messages are sequentially received from the transmitting unit; sequentially parsing the messages received; and when a message parsed is a synchronization message, blocking relaying to the receiving unit, of the data messages following said synchronization message, until an event associated with the synchronization message occurs.

13 Claims, 12 Drawing Sheets

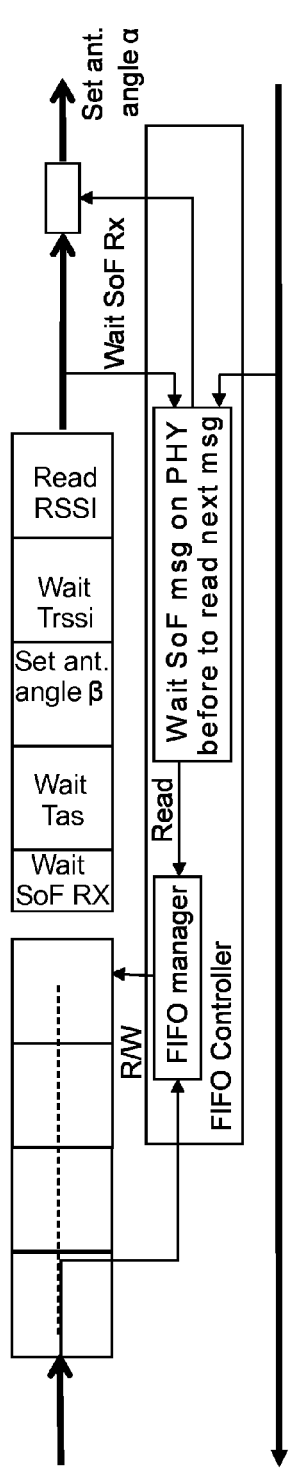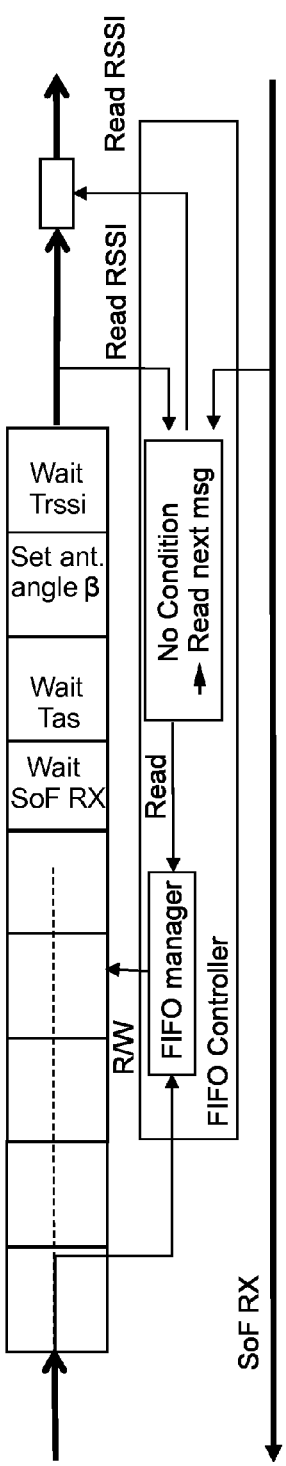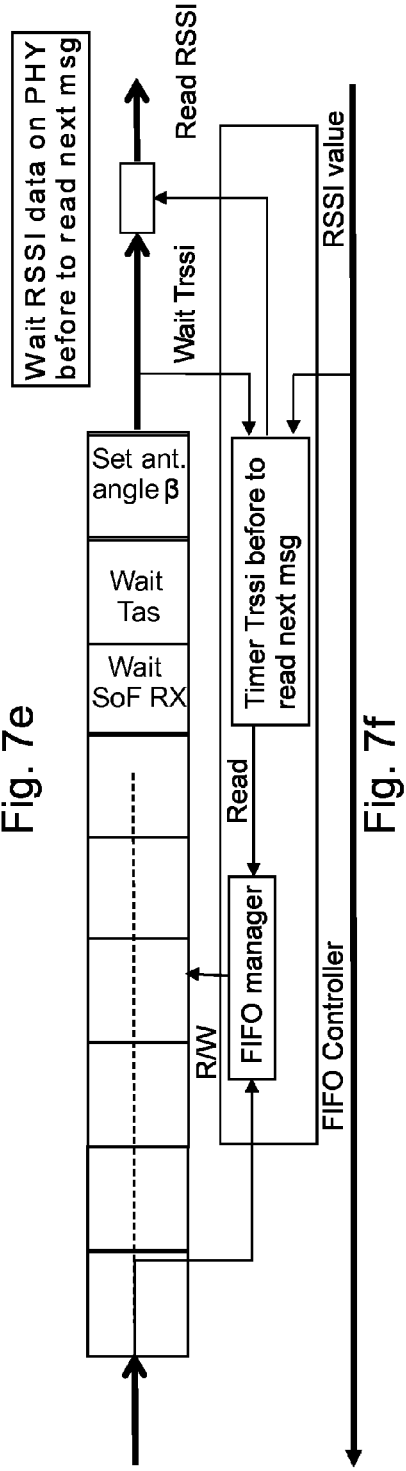

TIME SENSITIVE TRANSACTION OVER AN ASYNCHRONOUS SERIAL LINK

The current application claims the benefit of Great Britain Patent Application No. 1212517.5 filed Jul. 13, 2012, which is hereby incorporated by reference herein in its entirety.

TECHNICAL FIELD

The present invention relates to communication devices in communication networks. Embodiments of the invention relate to a communication link between a MAC layer and a PHY layer of communication devices of a communication network.

BACKGROUND

Multi-GHz radio communication networks, as for instance 60 GHz radio communication networks, are well suited for transmission of data at multi-Gigabits per second over limited distances.

Such multi-GHz radio communications are subject to shadowing and fading. For example, a physical obstacle in the wireless data transmission path from a source device to a receiving device may generate interferences that impact the communications. This may result in unrecoverable errors in the signal received by the destination device.

In order to overcome the effects of shadowing and fading, the respective antenna of the source and destination devices may be placed at locations at which the risk of occurrence of shadowing and fading is reduced. For instance, the devices may be placed above a given height in a room in which users are supposed to move (user may constitute moving obstacles).

Another way to overcome the effects of shadowing and fading may be to add diversity in the signals exchanged. Diversity may be obtained by using a plurality of antennas for transmitting and/or receiving the signals and separate these antennas by a minimum predefined distance. This may ensure different transmission conditions from the source device to the destination device.

In some multi-GHz (e.g. 60 GHz) radio communication devices, the RF (radio frequency) antennas are directly integrated on top of the radiofrequency (RF) chip which forms the PHY layer module (or PHY module).

According to some radio communication standards, such as the ECMA-369 standard specification, the MAC layer in a transmitting device and the PHY layer in a receiving device communicate through a parallel connection, also referred to as the MAC-PHY connection. Such a MAC-PHY connection is represented in FIG. 1.

FIG. 1 represents a parallel connection 100 between a MAC layer 101 and a PHY layer 102, comprising three different sub-connections:
 a control data sub-connection 103;
 an application data sub-connection 104; and
 a management data sub-connection 105.

The control data sub-connection 103 is used by the MAC layer 101 for initiating a transmission of a MAC frame over the network to the PHY layer 102. In order to initiate the transmission of the MAC frame, the MAC layer 101 uses a signal TX_START. The control data sub-connection 103 is also used by the PHY layer 102 for indicating that a MAC frame has been received from the network. In order to indicate that the MAC frame has been received, the PHY layer 102 uses a signal RX_START.

The management data sub-connection 105 is used by the MAC layer 101 and the PHY layer 102 for exchanging information relating to the setting up of the communication, such as information regarding the MAC frame structure.

The management data are a sub-class of the control data, with dedicated interfaces and a sub-connection.

The MAC layer 101 provides the PHY layer 102 with management data by activating a signal MGT_W which indicates that signals MGT_ADDW and MGT_DATAW are valid.

Signal MGT_DATAW carries the management data and signal MGT_ADDW represents the concerned register address.

When the signal MGT_W is valid, PHY layer 102 obtains the management data via the MGT_DATAW signal and the register address at which the management data shall be written, via signal MGT_ADDW.

For instance, the management data sub-connection 105 allows the MAC layer 101 to define the structure of a following MAC frame. The MAC frame has a plurality of data segments (maximum N), one register $DS_i$ (i=1 to N) being provided per such data segment according to its position in the MAC frame. Each register $DS_i$ may contain the respective data segment length $L_i$ and code rate $CR_i$ to be applied, as well as an identification of the coding scheme $CS_i$ to be applied.

The PHY layer 102 provides the MAC layer 101 with management data (such as triggering events, interruptions or exceptions) by activating the signal MGT_R which indicates that the signals MGT_ADDR and MGT_DATAR are valid. The management data are provided via the signals MGT_DATAR and the concerned register address via the signals MGT_ADDR.

When the signal MGT_R is valid, the MAC layer 101 obtains the management data via the signals MGT_DATAR and the register address at which said management data shall be written, via the signals MGT_ADDR.

The application data sub-connection 104 is used for exchanging the data payload of MAC frames. The application data sub-connection 104 uses a handshaking procedure, based on the signals DATA_TX_RQ and DATA_TX_EN for transmitting a MAC frame and based on the signals DATA_RX_RQ and DATA_RX_EN for receiving a MAC frame.

The signal DATA_TX_RQ is a flow control signal indicating that the PHY layer 102 requests application data from the MAC layer 101. In response, the MAC layer 101 activates the signal DATA_TX_EN (indicating that the signals DATA_TX are valid) and provides application data via the signals DATA_TX. When the signal DATA_TX_EN is valid, the MAC layer 101 obtains said application data via the signals DATA_TX.

The signal DATA_RX_RQ is a flow control signal indicating that the MAC layer 101 requests application data from the PHY layer 102. In response, the PHY layer 102 activates the signal DATA_RX_EN (indicating that the signals DATA_RX are valid) and provides application data via the signals DATA_RX. When the signal DATA_RX_EN is valid, the MAC layer 101 obtains said application data via the signals DATA_RX.

The data exchanges, either to transmit a MAC frame or to receive a MAC frame, are scheduled according to a clock signal DATA_CLK provided by the PHY layer 102 to the MAC layer 101.

It can be understood, from the brief description above, that such a parallel connection uses a handshake-based communication protocol, i.e. a communication protocol involving feedback.

The number of pins required to implement such a MAC-PHY connection increases with the data rate to be supported. Therefore, it lacks flexibility to face the aforementioned shadowing and fading phenomena. Indeed, it requires either to place the whole communication devices in an appropriate location (for instance, above a given height, as already mentioned) or to implement a complex and costly long-distance parallel connection (due to the high number of pins to support).

The Serial Gigabit Media Independent Interface (SGMII) specification has been proposed in order to convey network data and information about port speed (selected from 10/100/1000 Mbps) between a 10/100/1000 Mbps PHY layer and an Ethernet MAC layer with a reduced number of signal pins than required for conventional MAC-PHY connections. SGMII uses two data signals and two clock signals to convey frame data and link rate information between the 10/100/1000 Mbps PHY layer and the Ethernet MAC layer.

Even though the SGMII specification simplifies the electrical layout by reducing the number of necessary pins, the specified interface does not provide a sufficiently low communication latency of the MAC-PHY connection to efficiently allow multi-Gigabits per second data rates. Indeed, according to the SGMII specification, a handshake-based communication protocol is implemented between the MAC layer and the PHY layer, as well as a negotiation about the data rate, at the setting up of the connection.

However, according to some wireless standards, like IEEE 802.15.3c for instance, the data rate may change from frame to frame and also during a single frame. For example, the data rate may change up to 8 times during a single MAC frame. Handshaking is not compatible with the low latency requirement of multi-Gigabits per second communications in between distant communication devices.

A similar issue exists when the MAC layer and the PHY layer are on a single PCB (Printed Circuit Board). Indeed, the high number of pins required to implement the MAC-PHY interface implies high routing cost if the chips respectively embedding the MAC layer and the PHY layer have to be placed at specific locations on the board, due to design constraints.

In this context, document EP 2 398 205 discloses using adapters in order to emulate the parallel connection while using an asynchronous serial link.

The present inventors have found that improvements may be provided concerning the use of an asynchronous serial link between MAC and PHY modules, especially when performing time sensitive transactions between these modules.

"Time sensitive transactions" may refer to transactions involving actions which shall be completed in a predetermined time and/or actions which shall be triggered by the occurrence of an event within a predetermined time. Such transactions require low latency.

For instance, if the MAC layer defines that the PHY layer has to start an action when a particular event occurs at the PHY layer. Using adapters emulating a parallel connection on an asynchronous serial link may introduce latency. For example, latency may be introduced if a feedback to the MAC layer through the serial link is required when the event occurs and if the action requested has to be transmitted from the MAC layer to the PHY layer through the serial link again.

FIG. 2 is an illustration of the latency discussed above.

When an event which shall trigger an action occurs at time T0, the MAC layer is informed through the serial link. Transmission C1 of the information takes some time, and the MAC layer is informed at time T1. Then, at time T2, the MAC layer outputs an order message (or control message) to perform the action. The transmission C2 of the order through the serial link takes some time and the order is received by the PHY layer at time T3.

In systems which don't use a serial link between the MAC and PHY layers, transmissions C1 and C2 are quite instantaneous and then the overall latency from T0 to T3 is almost limited to the MAC layer's latency (between T1 and T2).

However, when using a serial link, the overall latency is much greater and it might be critical when transactions timing shall be compliant with physical constraint, like the duration of a signal.

Document US 2011/0125944 discloses a method of synchronizing transactions between an initiator and recipients, wherein the initiator informs the recipients it wants to apply a synchronous command, the recipients generate a barrier by a barrier generator, and as long as the barrier conditions are not fulfilled, the initiator blocks its synchronous commands.

When all requested conditions are fulfilled, the barrier generator informs the initiator that the system is ready for the synchronous command. Next, the initiator can send its synchronous command.

This method necessitates interactions between the initiator and the recipients. Also, recipients must know the algorithm for generating and managing the appropriate barrier. This may not be desirable.

SUMMARY OF THE INVENTION

In view of the above, there is a need for improving the management of asynchronous serial links (or bus) between MAC and PHY modules, especially when performing time sensitive transactions between these modules.

According to a first aspect of the invention, there is provided a method of controlling data transmission from a transmitting unit to a receiving unit, through an asynchronous serial link, the method comprising the following steps, performed by a controlling unit:

sequentially receiving data messages and synchronization messages from the transmitting unit, sequentially parsing the messages received, and when a message parsed is a synchronization message, blocking relaying to the receiving unit, of the data messages following said synchronization message, until an event associated with the synchronization message occurs.

The data messages may be of any kind. In the following description, for example, the data messages considered are "control messages" in a radio communication system. The control messages are to be differentiated from the payload data transmitted between the transmitting unit and the receiving unit.

The synchronization messages are associated to an event. It may also be referred to a "condition". In the following description, the synchronization messages are referred to "conditional messages".

Embodiments make it possible to implement time sensitive transactions using an asynchronous serial link.

Also, it may be made possible to implement transaction script sequences which do not necessitate intervention by the transmitting unit (such as a MAC module for instance), thereby avoiding adding latency.

Embodiments are compliant with any receiving units (such as PHY modules). Data messages may be delivered to it without necessitating any actions from it.

For example, the event is the expiration of a timer defined in the synchronization message. Such events may be referred to as of the "time driven" type.

Events of such type make it possible not to involve the transmitting unit or the receiving unit during the process of relaying the data messages after blocking.

The timer may be clocked on the basis of the cycles of a communication channel, said cycles defining time periods for transmitting the messages through said communication channel.

In the following description, the communication channel may be set between interface modules respectively connected to the transmitting unit and the receiving unit.

For example, one interface module connected to the transmitting unit emulates the communication interface of the receiving unit and another interface module connected to the receiving unit emulates the communication interface of the transmitting unit.

Clocking the timer on the basis of the cycles of the communication channel makes it possible for the transmitting unit to modify the duration of the cycles in order to control the timer duration and thus the processing of the message.

Also, using a timer clocked based on the period of the communication channel, for example, based on the period of the packets transmitted through a MAC-PHY link, makes it possible to control the timer even after transmission of the data messages or conditional messages through the asynchronous serial link.

A same predefined control sequence may be thus used whatever the PHY specifications and the timer clock may be adapted to match the specifications of the connected PHY module.

According to embodiments, the event is the receipt of a message by the controlling unit through the communication channel.

Thus, the transmitting unit (for example a MAC module) may have full control of the relaying of its messages to the receiving unit. Such an event may be used, for example, in case an event initially expected to occur does not for forcing a message to be relayed. This type of procedure is referred to as a "watchdog" in the following description.

According to embodiments, the event is the receipt of a message by the controlling unit through a communication channel different from the communication channel through which are transmitted the data massages and the synchronization messages.

Thus, relaying may be restarted after blocking, using an auxiliary communication channel. For example, in case an error occurs in detecting the initially expected event, the relaying may be restarted by other means.

According to embodiments, the event is the receipt of a given number of messages by the first adapter though one or more communication channels.

This may be used for defining a duration relatively to the size of the messages. An implementation may be to use a number of messages rather than an explicit duration to provide the possibility of changing that duration on the fly (after the command has been transmitted by the transmitting apparatus) by changing subsequent messages size.

According to embodiments, the event is the receipt of a triggering message generated by the receiving unit.

Thus, relaying of the data messages may depend on the receiving unit's activity.

The messages received by the control unit may be queued in a FIFO (First In First Out) buffer, and blocking relaying of the data messages may comprise stopping reading the FIFO buffer.

Thus, the transmitting unit does not have to manage the delivering of the data messages to the receiving unit. The data messages are stored as they are emitted by the transmitting unit, in view of their retransmission to the receiving unit.

For example, reading of the FIFO buffer is restarted after the event occurs.

Thus, there is no need to generate a particular event for resuming the relaying process after blocking.

The synchronization message may contain an identification of the event.

Thus, the controlling unit may distinguish time driven events from conditional events. According to the event identified, the controlling unit may take the necessary steps (for example, triggering a timer, monitoring receipt of a specific message).

According to embodiments, the receiving unit implements a PHY layer of a communication protocol used by a communication system comprising said receiving and transmitting units.

According to embodiments, the transmitting unit may implement a MAC (Medium Access Control) layer of a communication protocol used by a communication system comprising said receiving and transmitting units.

According to embodiments, the transmitting unit's interface may be emulated for the receiving unit. For example, emulating is performed by the controlling unit.

Such embodiments may be compatible with communication systems as disclosed in document EP 2 398 205.

For example, the controlling unit is comprised in the asynchronous serial link. However, the controlling unit may be embedded in other modules such as the transmitting unit, the receiving unit or other modules.

According to embodiments, the asynchronous serial link emulates a parallel connection.

According to a second aspect of the invention, there is provided a method of transmitting, through an asynchronous serial link, a data message from a transmitting unit for relaying to a receiving unit, the method comprising the following steps:

generating a synchronization message associated to an event upon which relaying of the data message to the receiving unit is conditional, and sequentially transmitting the synchronization message, then the data message to a controlling unit for relaying to the receiving unit.

The method according to the second aspect relates to the generation of the synchronization messages used by the controlling unit for relaying the data messages according to the first aspect.

The method may further comprise parsing data messages to be transmitted in order to determine whether relaying should be made conditional upon the event, and performing the sequential transmission step depending on the determination step.

Thus, the transmitting unit may decide whether the data messages should be retransmitted (or relayed) without delay or retransmitted after an event has occurred (time driven event or conditional event).

For example, the data messages and the synchronization messages are transmitted to a controlling unit between the transmitting unit and said receiving unit.

The method may further comprise the following steps:
monitoring the relaying of the data message to the receiving unit, and
when the event has occurred and the data message has not been relayed to the receiving unit, transmitting a forcing message for forcing the relaying of the data message.

Then, in case the expected event has not occurred, or in case an error made the controlling unit not detect that the event has occurred, the transmitting unit can make sure that the data message is eventually relayed.

For example, the receiving unit implements a PHY layer of a communication protocol used by a communication system comprising said receiving and transmitting units.

For example, the transmitting unit implements a MAC (Medium Access Control) layer of a communication protocol used by a communication system comprising said receiving and transmitting units.

According to embodiments, the asynchronous serial link emulates a parallel connection.

According to third and fourth aspects of the invention there are provided computer programs and computer program products comprising instructions for implementing methods according to the first and second aspects of the invention, when loaded and executed on computer means of a programmable apparatus such as a controlling unit or a transmitting unit.

According to an embodiment, information storage means readable by a computer or a microprocessor store instructions of a computer program, that it makes it possible to implement a method according the first and/or second aspects of the invention.

According to a fifth aspect of the invention, there is provided a controlling unit configured for implementing a method according to the first aspect.

Such a controlling unit, for controlling data transmission from a transmitting unit to a receiving unit, through an asynchronous serial link, may comprise:
  a communication unit configured for sequentially receiving data messages and synchronization messages from the transmitting unit,
  a processing unit for sequentially parsing the messages received, and, when a message parsed is a synchronization message, for blocking relaying to the receiving unit, of the data messages following said synchronization message, until an event associated with the synchronization message occurs.

Also, the processing unit may be further configured for setting a timer when the event is the expiration of a timer defined in the synchronization message.

The processing unit may be further configured for clocking the timer on the basis of the cycles of a communication channel, said cycles defining time periods for transmitting the messages through said communication channel.

For example the event is at least one of:
  the receipt of a message by the controlling unit through the communication channel,
  the receipt of a message by the controlling unit though a communication channel different from the communication channel through which are transmitted the data messages and the synchronization messages,
  the receipt of a given number of messages by the controlling unit though one or more communication channels, and
  the receipt of a message generated by the receiving unit.

The controlling unit may further comprise a FIFO (First In First Out) buffer, and the processing unit may further be configured for queuing the messages received in said buffer and wherein blocking relaying of the data messages comprises stopping reading the FIFO buffer.

Reading of the FIFO buffer may be restarted after the event occurs.

For example, the synchronization message contains an identification of the event.

The receiving unit may implement a PHY layer of a communication protocol used by a communication system comprising said receiving and transmitting units.

The transmitting unit may implement a MAC (Medium Access Control) layer of a communication protocol used by a communication system comprising said receiving and transmitting units.

For example, the processing unit may be further configured for emulating, for the receiving unit, the transmitting unit's interface.

According to a sixth aspect of the invention, there is provided an asynchronous serial link comprising a controlling unit according to the fifth aspect. For example, the asynchronous serial link according is configured for emulating a parallel connection.

According to a seventh aspect of the invention, there is provided a transmitting unit configured for implementing a method according to the second aspect.

Such a transmitting unit for transmitting a data message for relaying to a receiving unit, through an asynchronous serial link, may comprise:
  a processing unit configured for generating a synchronization message associated to an event upon which relaying of the data message to the receiving unit is conditional, and
  a communication unit configured for sequentially transmitting the synchronization message, then the data message to a controlling unit for relaying to the receiving unit.

For example, the processing unit is further configured for parsing data messages to be transmitted in order to determine whether relaying should be made conditional upon the event, and further configured for making the sequential transmission dependent on the determination result.

According to embodiments, the controlling unit is between the transmitting unit and the receiving unit.

The processing unit may be further configured for monitoring the relaying of the data message to the receiving unit, and, when the event has occurred and the data message has not been relayed to the receiving unit, transmitting a forcing message for forcing the relaying of the data message.

The receiving unit may implement a PHY layer of a communication protocol used by a communication system comprising said receiving and transmitting units.

The transmitting unit may implement a MAC (Medium Access Control) layer of a communication protocol used by a communication system comprising said receiving and transmitting units.

The asynchronous serial link may emulate a parallel connection.

BRIEF DESCRIPTION OF THE DRAWINGS

Other features and advantages of the invention will become apparent from the following description of non-limiting exemplary embodiments, with reference to the appended drawings, in which:

FIGS. 7*a* to 7*g* show an exemplary sequence of messages in a FIFO buffer for finding an antenna angle which gives the highest radio signal energy in a radio communication system.

DETAILED DESCRIPTION

According to embodiments of the invention, synchronization messages, or "Conditional messages" (CDM) are sequentially transmitted before the data messages, or "Control messages" (CM). The control messages may be aimed at requesting actions from a PHY layer of a device. The conditional messages may be associated to events, such as time driven events.

Conditional messages and Control messages are transmitted together over a serial bus between a transmitting unit and a receiving unit.

When a control message is preceded by a conditional message, the control message is delivered to the receiving unit only when the condition (or event) embedded in the conditional message is fulfilled.

When a control message is not preceded by a conditional message, the control message is delivered immediately after reception, i.e. without checking, or waiting for a condition to be fulfilled or an event to occur.

CDM messages may be, for example, based on events (the "event" type). They may also be based on time (the "time driven" type). Other types of CDM messages may be envisaged.

The events associated with conditional messages may be, for example, events occurring on the MAC or the PHY side.

When a conditional message is based on time, the timer clock may be based on the asynchronous link packet period which is controlled by the asynchronous link interface of the MAC module (TX).

In what follows, there is described a communication between a MAC module (transmitting unit) and a PHY module (receiving unit), involving time sensitive actions requested by the MAC module to the PHY module. However, other embodiments may be envisaged.

The MAC module has means for generating conditional messages and sequentially transmitting them before control messages to be delivered to the PHY module. The conditional messages are defined by the MAC module and embed a list of conditions to be fulfilled for triggering the retransmission (or relaying) of the control message coming just after.

The control messages and the conditional messages are transmitted to a control unit which comprises means for identifying a type of the messages received (conditional message or control message). The control unit has also means for monitoring the occurrence of events at the PHY or MAC sides and means for measuring time durations in case the event defined in the conditional message is of the time driven type (for example on the basis of a PHY clock reference, on the basis of the Asynchronous Link packet period, etc.).

The controlling unit has also means for forwarding the control messages to the PHY module under control of a signal (i.e. when Control messages are not preceded by a conditional message or when the condition embedded in the preceding conditional message is fulfilled).

In what follows, the controlling unit is referred to as a "synchronous events regeneration module". It is a unit disposed between the transmitting and receiving units. However, other implementations may be envisaged.

Figure 3:
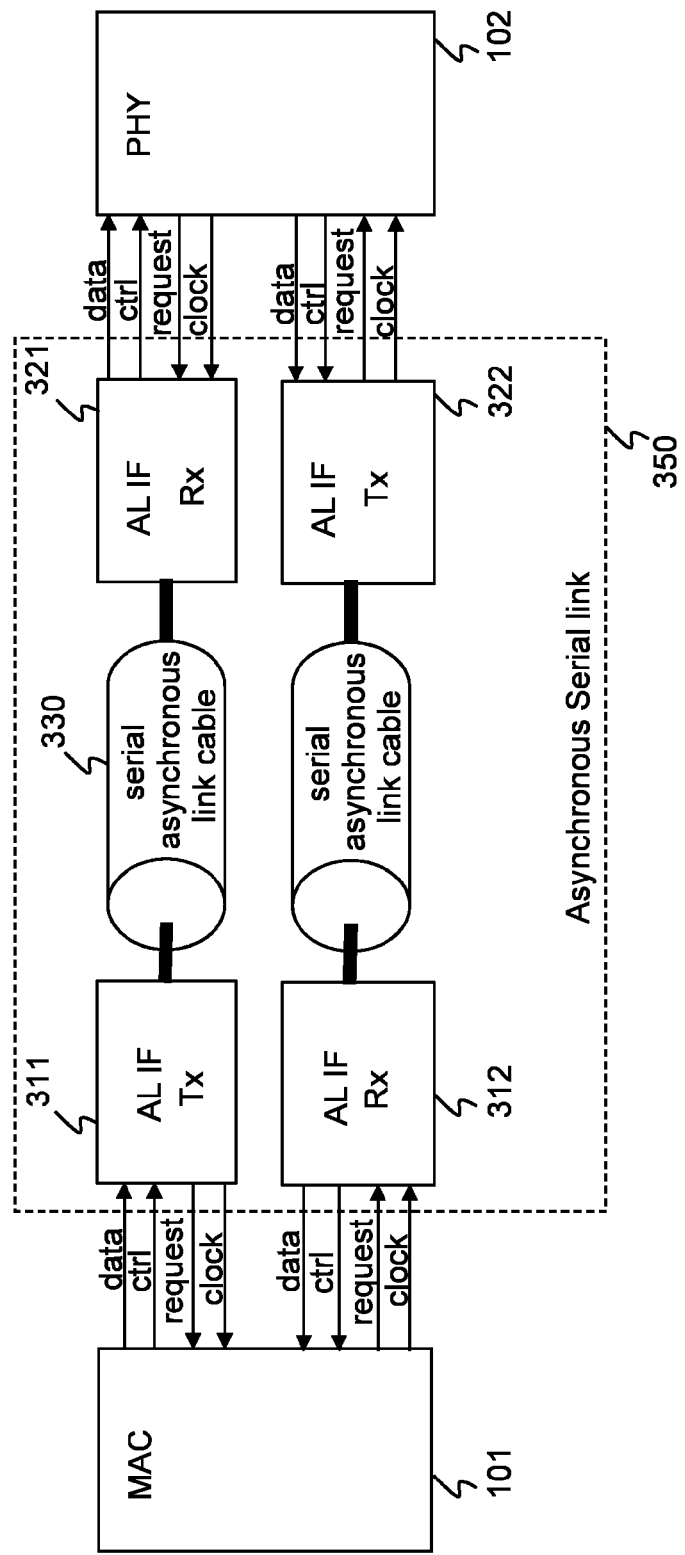
FIG. 3 is an illustration of a MAC-PHY connection using an asynchronous serial link.

FIG. 3 illustrates a MAC-PHY connection using an asynchronous serial link.

Figure 1:
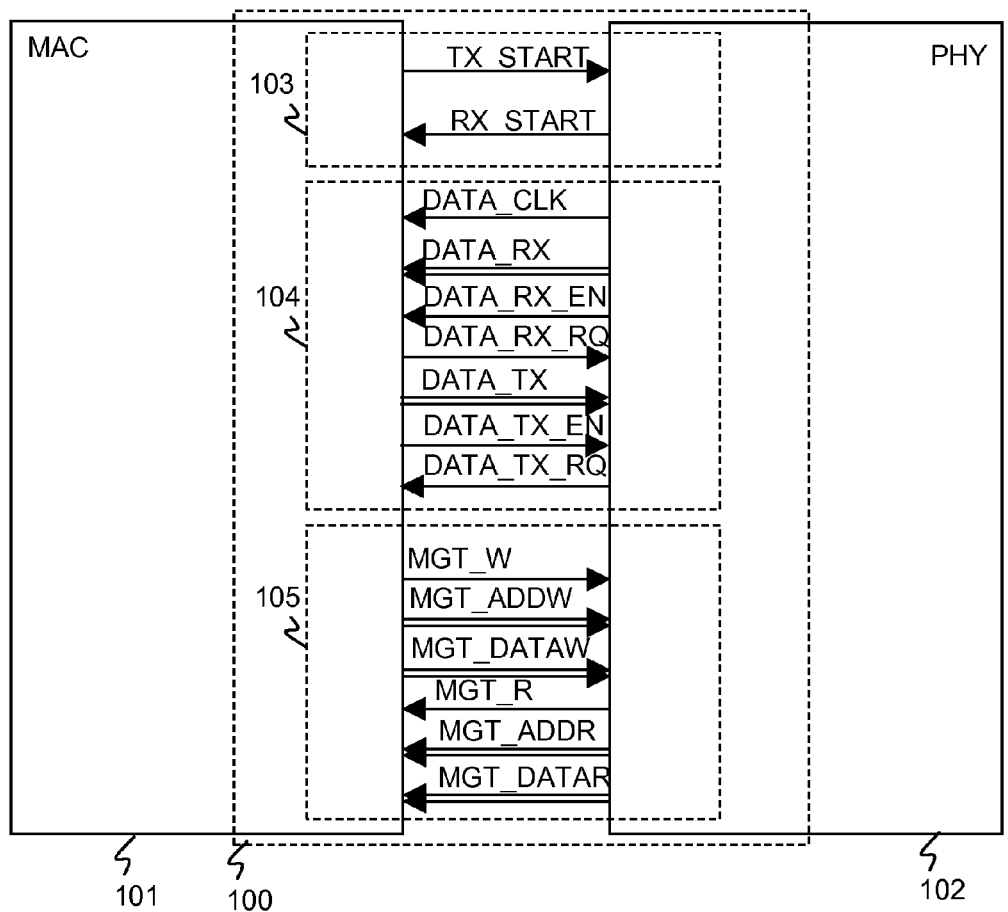
FIG. 1 represents a parallel connection 100 between a MAC layer 101 and a PHY layer 102.
Figure 2:
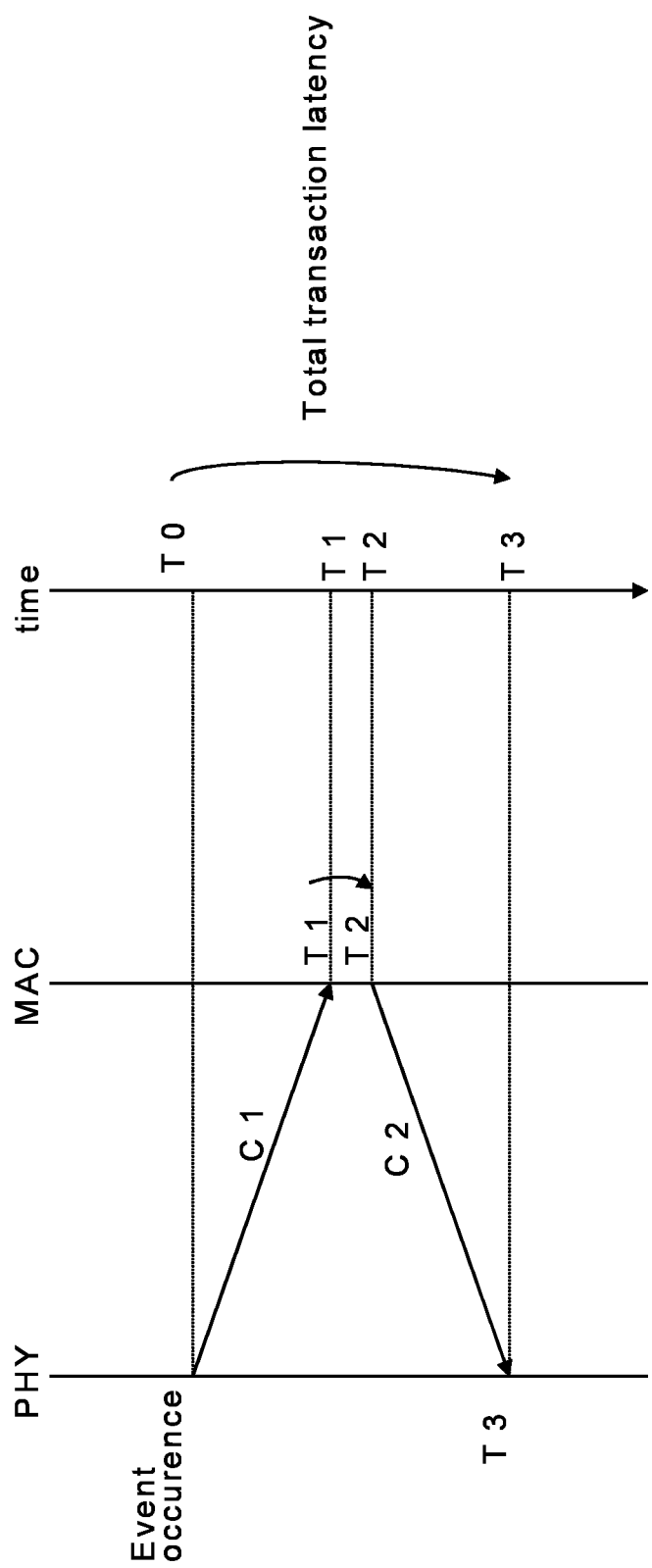
FIG. 2 is an illustration of a latency as discussed above.

The MAC layer 101 and the PHY layer 102 are identical to those previously described with reference to FIG. 1. In order to achieve the interconnection between these two modules through the serial link, the following modules have been added: modules 311 and 322 named "Asynchronous Link Interface transmission" modules (AL IF Tx) which process data coming from the MAC or the PHY modules in order to transmit them through the serial link and modules 321 and 312 named "Asynchronous Link Interface Reception" modules (AL IF Rx) which process data coming from the serial link in order to transmit them to the MAC or the PHY modules.

Modules 311, 312, 321, 322 together with the serial link cable 330 are comprised in the Asynchronous serial link. Such an asynchronous serial link is described in document EP 2 398 205.

Figure 4:
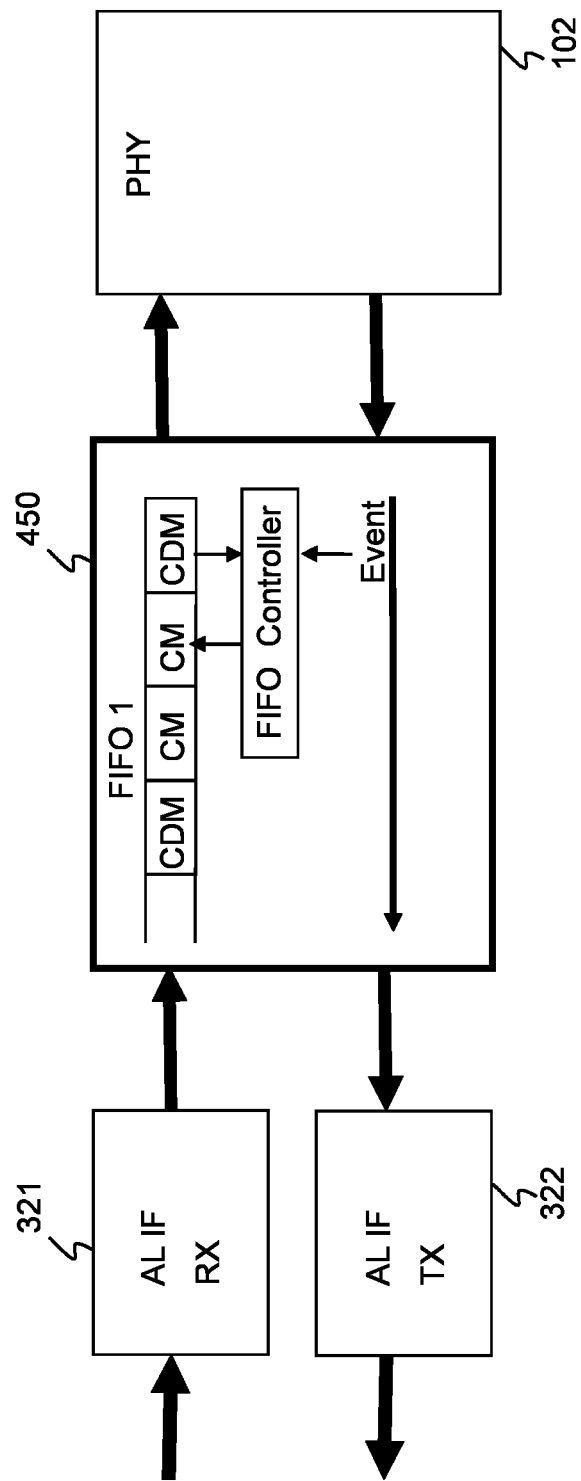
FIG. 4 is an illustration of additional means in the connection according to embodiments.

FIG. 4 shows additional means according to embodiments of the invention.

For the sake of conciseness, the following description is limited to synchronizing messages transmitted to a PHY module from a MAC module, through an asynchronous serial link. However, the invention is not limited to such kind of communications.

The "Asynchronous Link Interface Reception" module 321 and the "Asynchronous Link Interface transmission" module 322 are connected to the PHY module 102 through a "synchronous events regeneration module" 450.

The synchronous events regeneration module receives the messages transmitted through the serial link and forwards them to the PHY module according to their type (synchronization message or data message). When the message is a synchronization message, the message is forwarded depending on the condition that is associated with it by the MAC module.

Figure 5:
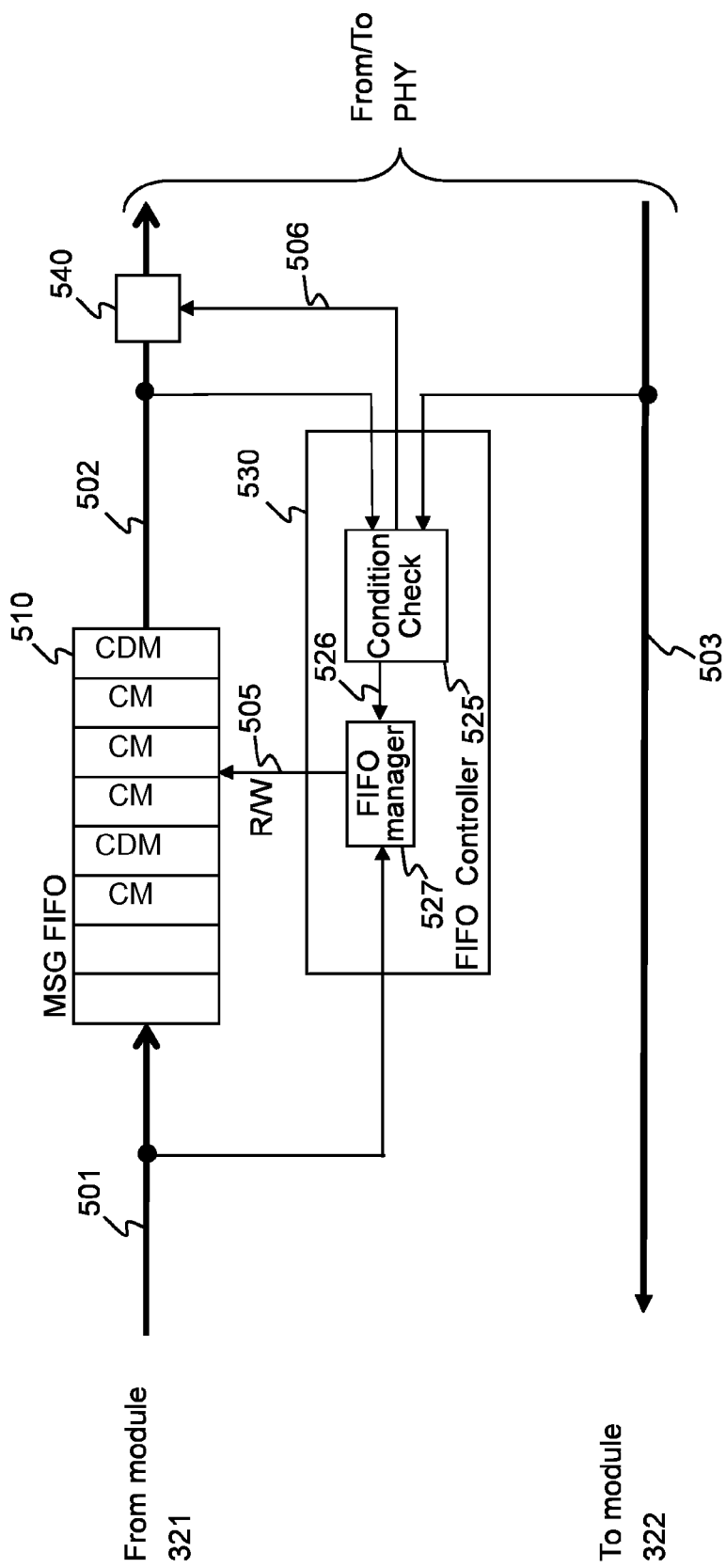
FIG. 5 is an illustration of a "synchronous events regeneration" module according to embodiments.

An exemplary synchronous events regeneration module 450 is described in more details with reference to FIG. 5.

The module comprises a buffer 510, for example a FIFO buffer ("First In First Out"), a FIFO controller 530 and "latch" module 540.

The MAC module sends at least two kinds of messages to the PHY module:
  Control messages (CM) for requesting specific actions to be performed by the PHY module, and
  Conditional messages (CDM) which are sequentially transmitted before CM messages and which are associated with events (such as time driven events).

After being processed by the "Asynchronous Link Interface Reception" module 321, the messages 501 are stored in the FIFO buffer 510. The messages 502 output by the buffer are forwarded to the latch module 540 as well as to a first input of the condition check module 525 embedded in the FIFO controller 530.

The messages received by the latch module are forwarded to the PHY module under control of the signal "enable" 506 which is generated by the condition check module 525.

The messages 503 coming from the PHY module are connected to a second input of the condition check module 525 as well as to the "Asynchronous Link Interface transmission" module 322.

For example, the Condition check module 525 receives also on a third input, the messages 501 coming from module 321 and received by the buffer 510.

The FIFO controller module manages the writing and reading of messages in the FIFO buffer through signal 505 as well as the control of the module 540 through signal 506.

Writing of messages in the FIFO buffer is controlled by the MAC module using the FIFO manager 527.

FIFO reading is also driven by the FIFO manager 527 on the basis of the signal 526 output by the condition check module 525.

Control of the FIFO reading and the latch module 540 is done as follows. First, each message 502 is parsed (or analysed) by the condition check module 525. Next, if the message is a Control message CM, the condition check module 525 activates the control signal 506 and the message is delivered immediately to the PHY module by the latch module 540

However, if the message is a Conditional message CDM, the condition check module 525 monitors the event specified in the CDM (which defines the event as well as its source—for instance the event is to occur at the MAC module or the PHY module). As long as the event doesn't occur, reading of the FIFO buffer is stopped (or blocked) and the control signal 506 is set in such a way that there is no message transmitted to the PHY module. When the specified event occurs, reading of the FIFO buffer restarts and the next message is parsed.

In case the Conditional message CDM of is of the "time driven" type (and not of the "event" type), the condition check module 525 initializes a timer on the basis of data embedded in the conditional message and starts the timer. When the time elapses, reading of the FIFO buffer restarts and the next message is analysed. The time base used for the timer may be either a time base issued from the PHY module or a time base determined according to the pace of the packets transmitted through the asynchronous serial link.

According to embodiments, the FIFO buffer and the FIFO controller may be merged with other parts embedded in the "Asynchronous Link Interface Reception" module 321.

Also, according to embodiments, synchronization of the transmission of events from the PHY module to the MAC module may be performed using a FIFO buffer for storing messages 503 and adding another FIFO controller and another condition checker similarly to what has been described above.

Figure 6:
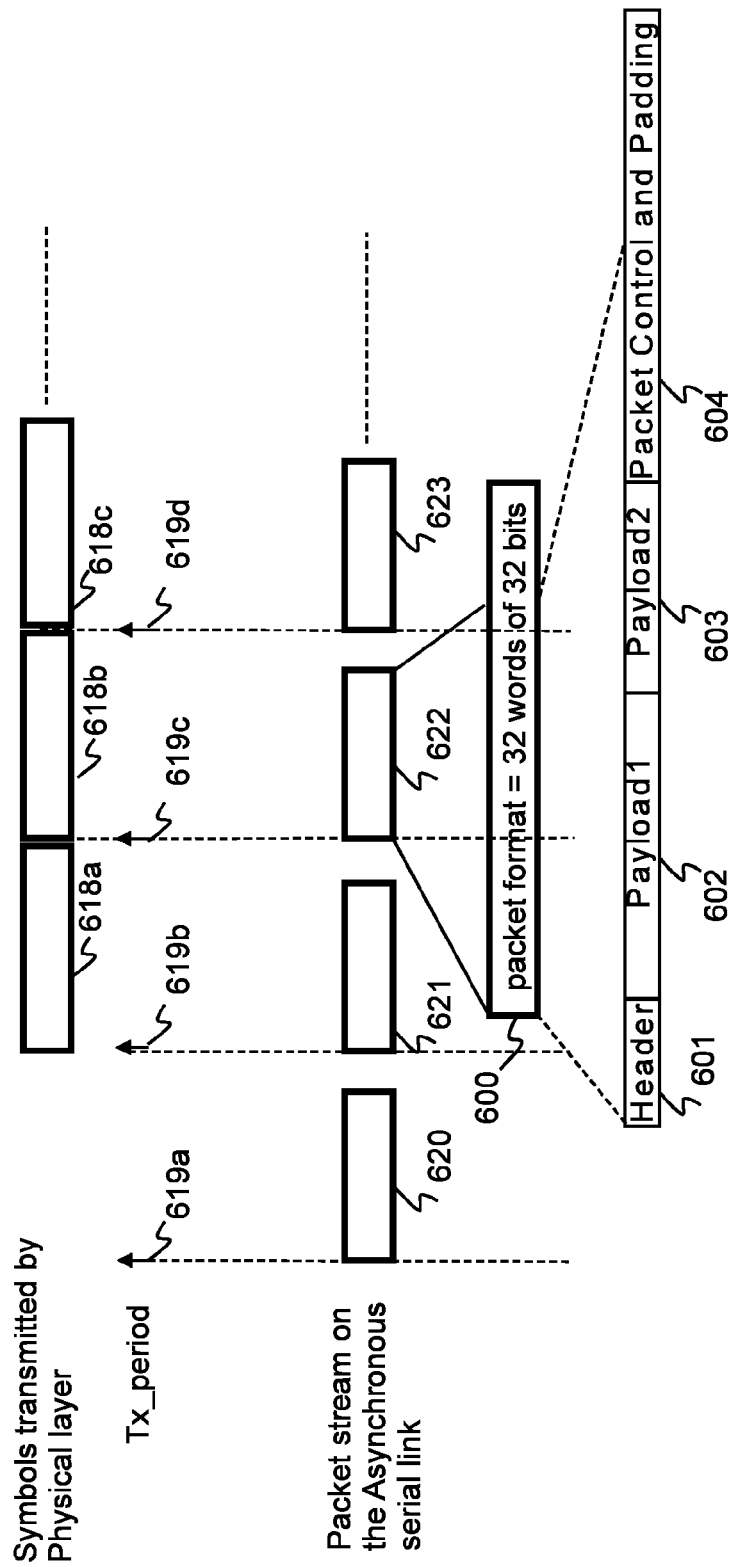
FIG. 6 is an illustration of a format of packets transmitted through the asynchronous serial link.

With reference to FIG. 6, there is illustrated the transfer of data through the asynchronous serial link. It is assumed that MAC data have been encoded and assembled into packets which are transferred through the asynchronous serial link in order to be encoded and sent by the PHY module.

Symbols 618*a*, 618*b*, 618*c*, etc. . . . are regularly transmitted by the PHY module with a predetermined and fixed period as defined by the radio system specifications.

The MAC serial adapter retransmits data at the same pace than the physical layer using a packet stream 620, 621, 622, and 623.

The symbol period used by the packet stream is not aligned with the real symbol period of the physical layer. Basically, each packet is transmitted according to a period equal to the symbol period as illustrated by the TX_period event 619.

However, it may be considered that the symbol period may slightly change in order to finely control the timer used for messages associated with a "time" event. As long as the number of data messages transmitted through the asynchronous serial link is sufficient to supply enough data to the PHY layer, it is possible to increase the duration of the period of the packet stream without disturbing the data transmission. Increasing the duration may increase the time measured by the timer enclosed in the condition checker.

Changing the duration of a counter without to have to modify the initialization value of the timer (transmitted via asynchronous messages) is useful for instance in case of change of characteristics of the PHY module while using predefined message sequences.

The packet 600 is comprises a header 601, a first payload 602, a second payload 603 and other control bits 604 used to manage the packet transmission and keep a constant length packet. For example, as illustrated in FIG. 6, the packet length is 32 words.

The first payload 601 is used to transmit data from the MAC frame data segments while the second payload 602 is used to transmit messages.

The MAC frame data segments and the first payload are high priority data and the Serial link adapter manages the bandwidth in order to fulfill the related data rate requirements.

Other data messages like control messages (PHY Control Management, I/O control) are transmitted according to a "best effort" mode. Synchronization between these messages can't be secured as transmission depends on bandwidth not reserved for MAC frame data.

FIGS. 7*a* to 7*g* show an exemplary sequence of messages used to find an antenna angle which gives the highest radio signal energy in a radio communication system.

a) After system initialization, a first antenna angle is set.
b) Next, it is waited for a duration Tas to elapse. The duration corresponds to the time required by the radio hardware to set the requested angle.
c) It is then waited for a Frame to be detected, which causes the "Start of frame" (SoF) signal to be output by the PHY receiver.
d) Once the SoF signal received, the measurement of the strength of the radio signal (RSSI) is requested.
e) Next, it is waited for a duration Trssi to elapse, which is the time required by the radio hardware to measure the RSSI and deliver it at the PHY receiver output.
f) In a following step, a second antenna angle is set.

Next, actions b) to e) are repeated as long as all angles have been tested.

At the end of the sequence, the strength of radio signal is known for each possible angle and thus, the system knows which angle to use preferably for the communication.

FIGS. 7*a* to 7*g* illustrate the first six successive steps of the sequence.

Control messages are written with an italic font and Conditional messages are written with a bold font.

Figure 7A:
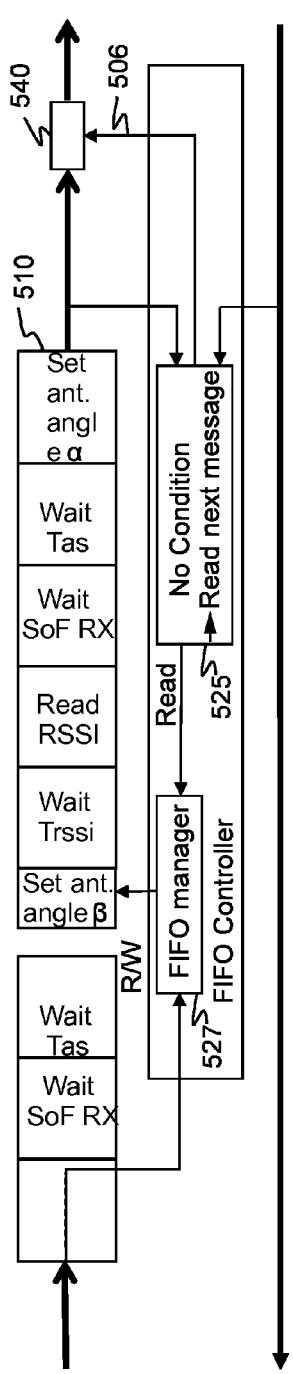

FIG. 7*a* is an illustration of the FIFO buffer content (only first messages) considering that the message sequence has been transferred to the FIFO buffer 510 during system initialization (the sequence could also be loaded while the sequence is played as long as the messages are received in time).

Figure 7B:
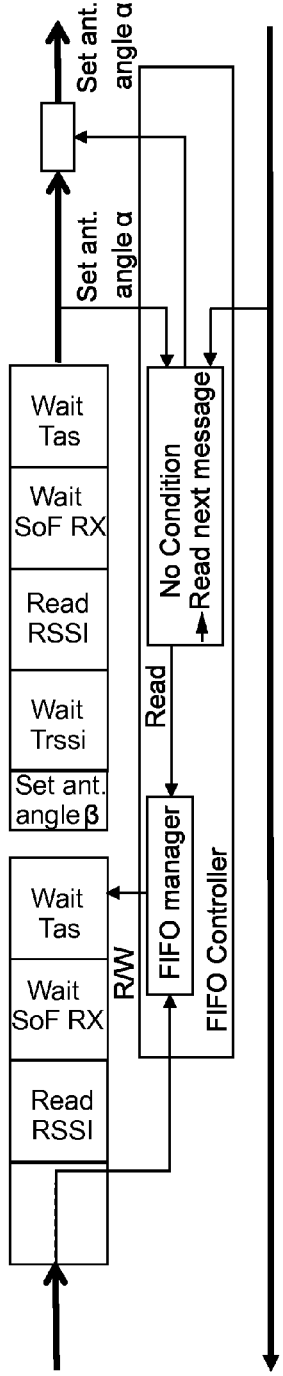

FIG. 7*b* is an illustration of the first step. The message "Set angle α" is read. Since this message is not a conditional message, the condition check module 525 sends a request to the module 540 for forwarding the message to the PHY module immediately and a request to the FIFO manager 527 for reading next message (next step).

Figure 7C:
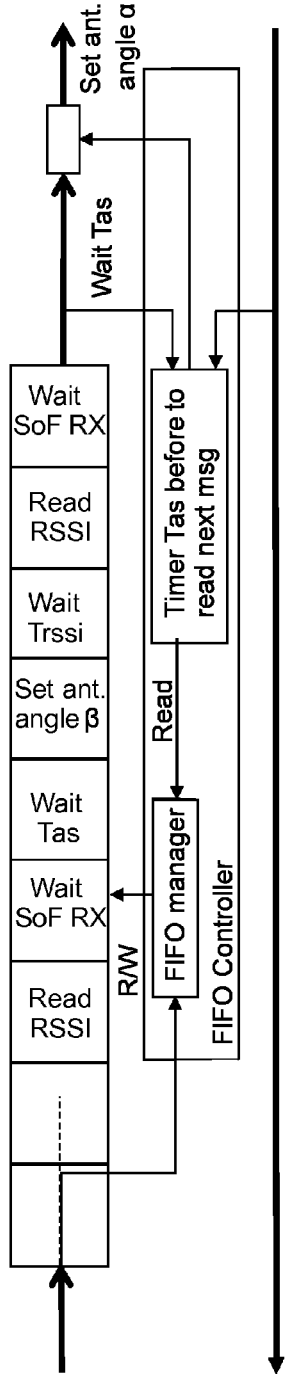

FIG. 7*c* is an illustration of the second step. The message "Wait Tas" is read. Since this message is a conditional message of the "time driven" type, the condition check module 525 starts a timer initialized with the Tas time value and when the Tas time elapses, it sends a request to the FIFO manager 527 for reading the next message (next step). Since the current message is a conditional message, it is not forwarded to the PHY module (under control of signal 506 the module 540 blocks the message).

FIG. 7*d* is an illustration of the third step. The message "Wait SoF Rx" is read. Since this message is a conditional message of the "event" type which specifies that next step will be performed when a Start of Frame (SoF) message is sent to the MAC module by the PHY module, the condition check module 525 scan messages sent by the PHY module. When a SoF message is output by the PHY module, the condition check module 525 requests to the FIFO manager 527 to read next message (next step). Since the current message is a conditional message, it is not forwarded to the PHY module (under control of signal 506 the module 540 blocks the message).

FIG. 7e is an illustration of the fourth step. The message "Read RSSI" is read. Since this message is not a conditional message, the condition check module 525 requests to the module 540 to forward the message to the PHY module immediately and requests to the FIFO manager 527 to read next message (next step).

FIG. 7f is an illustration of the fifth step. The message "Wait Trssi Rx" is read. Since this message is a conditional message of the "time driven" type, the condition check module 525 starts a timer initialized with the Trssi time value and when the Trssi time elapses, it requests to the FIFO manager 527 to read next message (next step). Since the current message is a conditional message, it is not forwarded to the PHY module (under control of signal 506 the module 540 blocks the message).

Figure 7G:
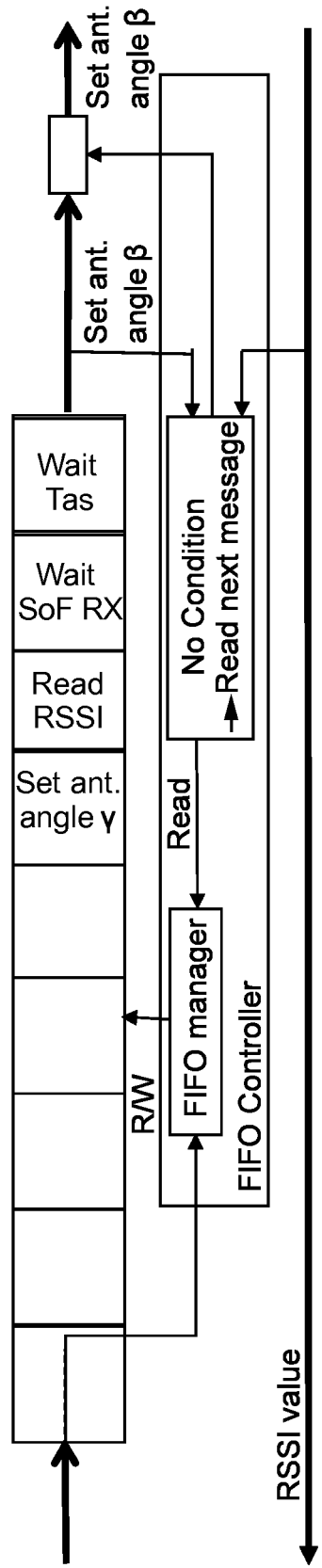

FIG. 7g is an illustration of the sixth step which is similar to the step illustrated in FIG. 7b. A new antenna angle is set and the same sequence run again.

If for the antenna angle requested to the PHY module, the radio signals received are weak, it may happen that the "Start of Frame" message will never be output by the PHY module.

In order to solve this problem, in that case, the MAC module may use a "watchdog" to limit the waiting time and if the watchdog wakes up, the MAC module records the absence of an SoF message, and decides to force the reading of the FIFO twice in order to request a new antenna angle. Once all antenna angles have been evaluated, the MAC module will see in the record that no SoF message has been received for the related angle and it will choose another angle to establish the communication.

That case illustrates the advantage to be able to control the FIFO reading also on the basis of an event output by the MAC module (input of the FIFO).

Figure 8:
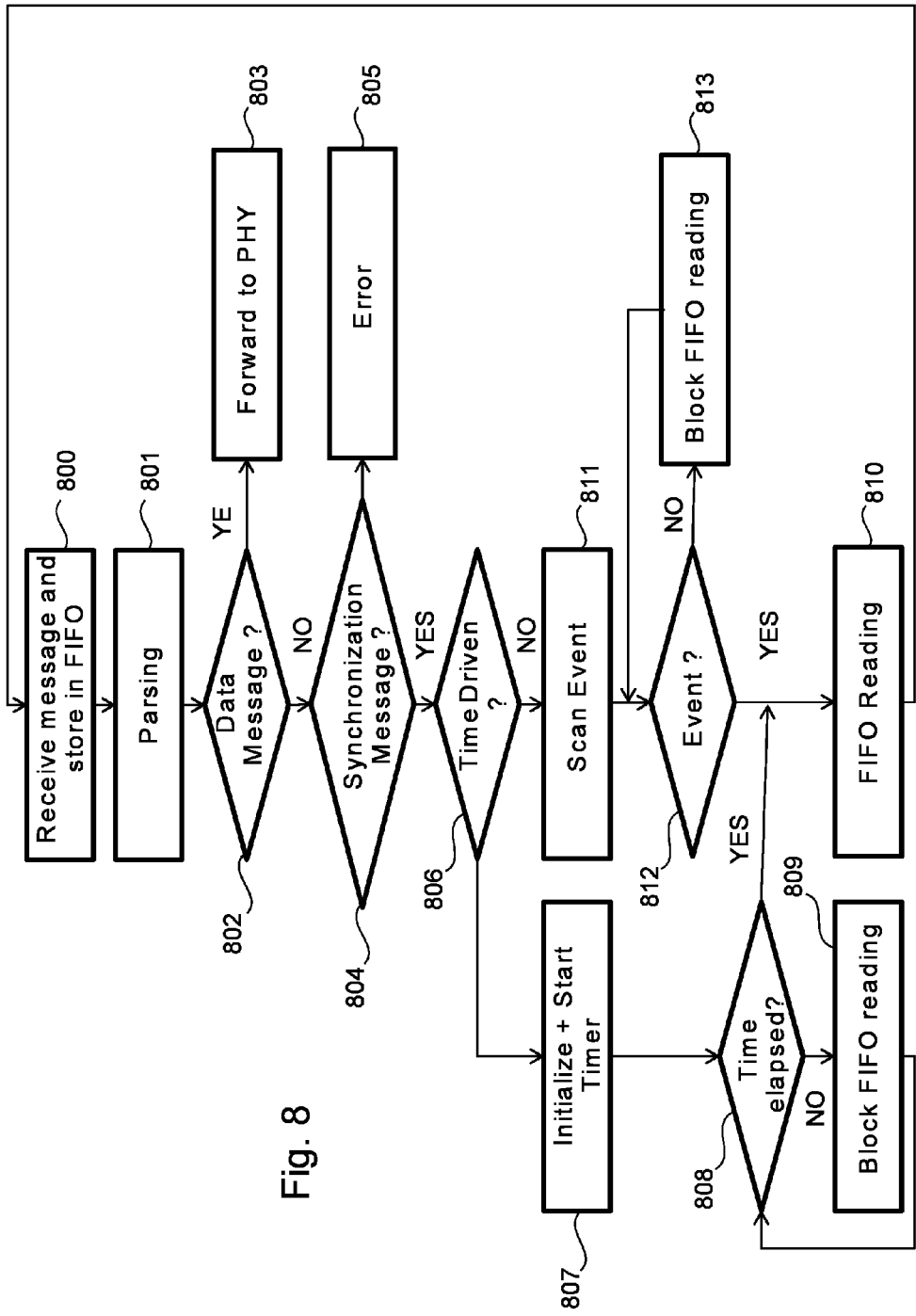
FIGS. 8 and 9 are flowcharts of steps of methods according to a general embodiment.

FIG. 8 is a flowchart of steps performed according to a general embodiment. The steps may be performed by a controlling unit according to embodiments, such as a "synchronous events regeneration module" as described above.

In a first step 800, a message is received from a transmitting unit, for example a MAC module of a communication device. The message is stored in a FIFO buffer. Next, the messages in the FIFO buffer are parsed during a step 801. A test 802 is performed in order to determine whether a message parsed is a data message (for example a control message). In case the message is a data message (YES), it is forwarded to a receiving unit (such as a PHY module of a communication device) during a step 803.

Otherwise (NO), a test is performed during a step 804 in order to determine whether the message received is a synchronization message (for example a conditional message). In case the message is not a synchronization message (NO), for the sake of conciseness, it is considered that an error has occurred and this is detected during step 805. For example, it is considered that only two kinds of messages can be received, the data messages or the synchronization messages. Of course, in case other kinds of messages can be received, step 805 may be adapted to process such messages.

In case the message received is a synchronization message (YES), it is determined during step 806 whether the synchronization message is of the "time driven" type. For example, the type of message is an information embedded in the message.

If the synchronization message is associated with a time driven event, a timer is initialized and started during step 807. Next, it is waited for the duration set by the timer to elapse during step 808. In case the duration has not elapsed, reading of the FIFO buffer is blocked in a step 809. The process then returns to step 808 until the duration elapses (YES).

Next, reading of the FIFO buffer is resumed in step 810 and the next message is parsed (step 801).

Back to step 806, in case the synchronization message is not of the "time driven" type (NO), it is considered that it is of the "event" type. In FIG. 8, there is no explicit step for checking this type of synchronization message, however, this may be envisaged. During step 811, monitoring of the event is started. For example, the event to expect is information embedded in the synchronization message.

Next, during step 812, it is tested whether the event occurs. In case it has not occurred (NO), the process goes to step 813 which is similar to step 809.

In case the event has occurred (YES), the process goes to step 810.

Figure 9:
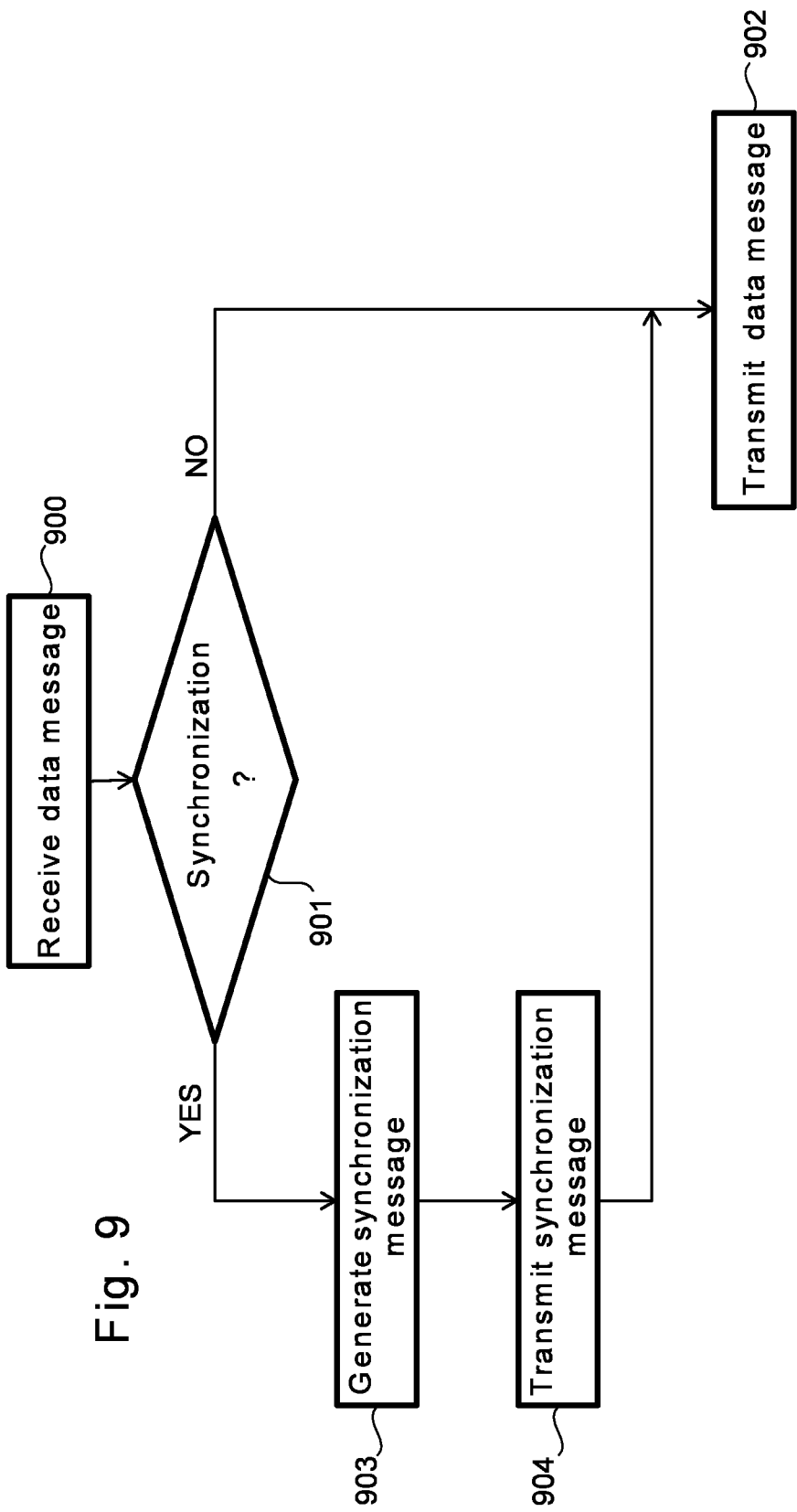

FIG. 9 is a flowchart of steps performed according to a general embodiment. The steps may be performed by a transmitting unit according to embodiments, such as a MAC module of a communication device.

A data message is received during a step 900. The message is to be transmitted to a receiving unit. Next, it is determined, during a step 901 whether the message can be received at any time by the receiving unit or whether receipt by it should be made conditional upon an event.

In case the data message can be received by the receiving unit without any particular synchronisation (NO), it is transmitted during a step 902, for example it is transmitted to a "synchronous events regeneration module" as described above.

Otherwise (YES), a synchronization message is generated during a step 903. The synchronization message may be of the "time driven" type, the "event" type or other types. Depending on the type of synchronization message, it embeds timing information or an identification of an event to expect or other kind of information.

Next, the synchronization message is transmitted (for example to the "synchronous events regeneration module") during a step 904, just before the data message itself is transmitted during step 902

Computer programs according to embodiments may be designed based on the flowcharts of FIGS. 8 and 9 and the present description.

Figure 10:
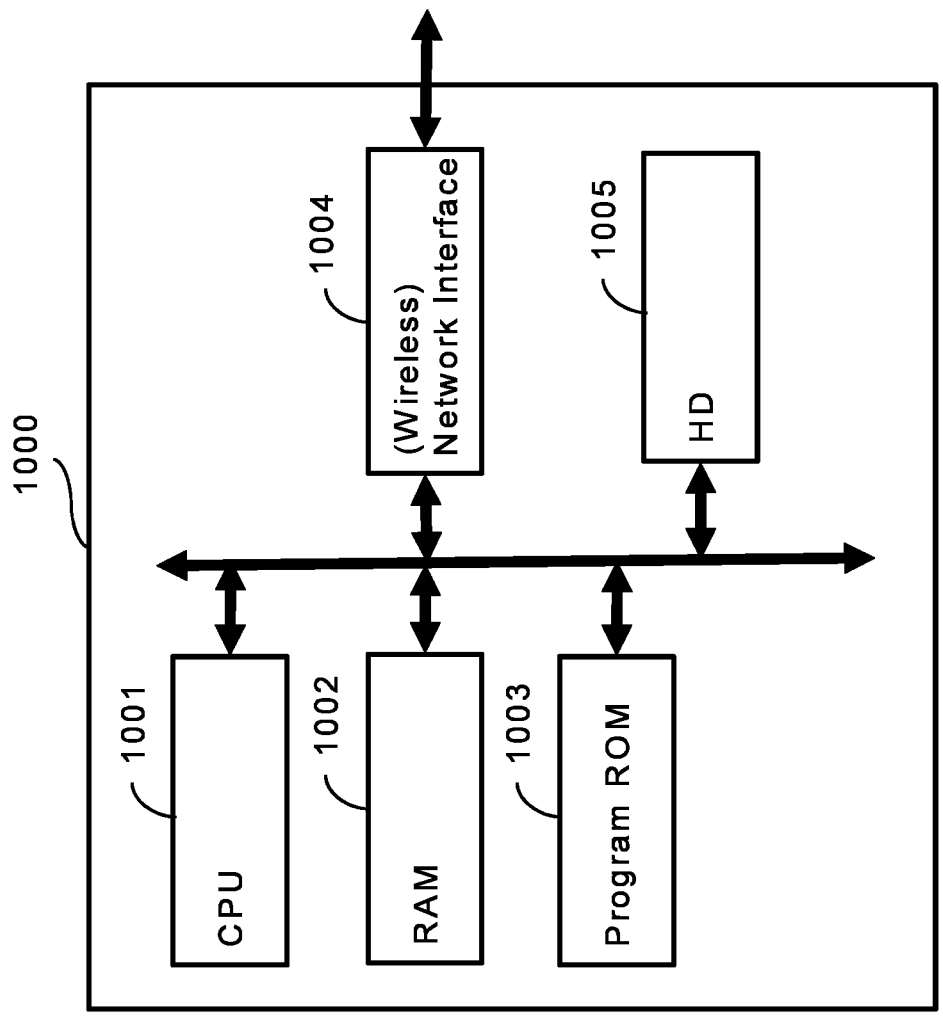
FIG. 10 is a schematic illustration of devices (or units) according to embodiments.

FIG. 10 is a schematic illustration of a controlling unit (or relaying unit) 1000 according to embodiments. The controlling unit comprises a RAM (Random Access Memory) unit 1002 for storing processing data used for computations for implementing methods according to embodiments. The RAM unit may comprise a FIFO buffer as described above.

The controlling unit may also comprise a ROM (Read Only Memory) unit 1003 for storing a computer program according to an embodiment. The controlling unit further comprises a control unit (or processing unit) 1001. The control unit 1001 may comprise a processor configured for implementing methods according to embodiments, for example by executing instructions of a computer program according to embodiments. The computer program may be loaded from the ROM unit 1003 or a hard-disc 1005. The controlling unit further comprises a communication unit (or interface) 1004 for communicating with other units or devices such as transmitting units and/or receiving units.

A transmitting unit according to embodiments may have a hardware structure similar to the one described with reference to FIG. 10.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. A single processor or other unit may fulfill the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method of controlling data transmission from a transmitting unit to a receiving unit, through an asynchronous serial link, the method comprising the following steps, performed by a controlling unit:
    sequentially receiving data messages and synchronization messages from the transmitting unit,
    sequentially parsing the messages received, and
    when a message parsed is a synchronization message, blocking relaying to the receiving unit, of the data messages following said synchronization message, until an event associated with the synchronization message occurs,
    wherein:
    when a data message is preceded by a synchronization message, the data message is delivered to the receiving unit when the event associated with the synchronization message occurs, and
    when a data message is not preceded by a synchronization message, the data message is delivered immediately after reception, without checking; or waiting for an event associated with the synchronization message to occur.

2. A method according to claim 1, wherein the event is an expiration of a timer defined in the synchronization message.

3. A method according to claim 2, wherein the timer is clocked on the basis of the cycles of a communication channel, said cycles defining time periods for transmitting the messages through said communication channel.

4. A method according to claim 1, wherein the event is at least one of:
    the receipt of a message by the controlling unit through the communication channel,
    the receipt of a message by the controlling unit though a communication channel different from the communication channel through which are transmitted the data messages and the synchronization messages,
    the receipt of a given number of messages by the controlling unit though one or more communication channels, and
    the receipt of a message generated by the receiving unit.

5. A method according to claim 1, further comprising queuing the messages received in a FIFO (First In First Out) buffer, and wherein blocking relaying of the data messages comprises stopping reading the FIFO buffer.

6. A method according to claim 5, wherein reading of the FIFO buffer is restarted after the event occurs.

7. A method according to claim 1, wherein the synchronization message contains an identification of the event.

8. A controlling unit for controlling data transmission from a transmitting unit to a receiving unit, through an asynchronous serial link, the controlling unit comprising:
    a communication unit configured for sequentially receiving data messages and synchronization messages from the transmitting unit,
    a processing unit for sequentially parsing the messages received, and, when a message parsed is a synchronization message, for blocking relaying to the receiving unit, of the data messages following said synchronization message, until an event associated with the synchronization message occurs,
    wherein:
    when a data message is preceded by a synchronization message, the data message is delivered to the receiving unit when the event associated with the synchronization message occurs, and
    when a data message is not preceded by a synchronization message, the data message is delivered immediately after reception, without checking or waiting for an event associated with the synchronization message to occur.

9. A controlling unit according to claim 8, wherein the processing unit is further configured for setting a timer when the event is an expiration of a timer defined in the synchronization message.

10. A controlling unit according to claim 9, wherein the processing unit is further configured for clocking the timer on the basis of the cycles of a communication channel, said cycles defining time periods for transmitting the messages through said communication channel.

11. A controlling unit according to claim 8, wherein the event is at least one of:
    the receipt of a message by the controlling unit through the communication channel,
    the receipt of a message by the controlling unit though a communication channel different from the communication channel through which are transmitted the data messages and the synchronization messages,
    the receipt of a given number of messages by the controlling unit though one or more communication channels, and
    the receipt of a message generated by the receiving unit.

12. A controlling unit according to claim 8, further comprising a FIFO (First In First Out) buffer, and wherein the processing unit is further configured for queuing the messages received in said buffer and wherein blocking relaying of the data messages comprises stopping reading the FIFO buffer.

13. A controlling unit according to claim 12, wherein reading of the FIFO buffer is restarted after the event occurs.

* * * * *